(12) United States Patent
Huang et al.

(10) Patent No.: US 7,628,834 B2
(45) Date of Patent: Dec. 8, 2009

(54) COMPRESSED AIR FILTER ASSEMBLY FOR NAIL GUN

(75) Inventors: Po-Feng Huang, Taipei Hsien (TW); Marco Laubach, Wheeling, IL (US)

(73) Assignees: De Poan Pneumatic Corp., Taipei (TW); Robert Bosch Tool Corporation, Mount Prospect, IL (US)

( * ) Notice: Subject to any disclaimer, the term of this patent is extended or adjusted under 35 U.S.C. 154(b) by 189 days.

(21) Appl. No.: 11/836,778

(22) Filed: Aug. 10, 2007

(65) Prior Publication Data

US 2009/0038277 A1 Feb. 12, 2009

(51) Int. Cl.
*B25C 1/04* (2006.01)
*B01D 46/00* (2006.01)

(52) U.S. Cl. .......................... 55/385.1; 55/499; 55/501; 173/168; 173/169; 227/130; 227/147

(58) Field of Classification Search ................ 55/385.1, 55/499, 501, 521; 81/57.44; 173/168, 169; 227/130, 147
See application file for complete search history.

(56) References Cited

U.S. PATENT DOCUMENTS

| | | | | |
|---|---|---|---|---|
| 4,810,272 A | * | 3/1989 | Overby | 55/420 |
| 5,049,172 A | * | 9/1991 | Shary et al. | 55/495 |
| 5,259,465 A | * | 11/1993 | Mukoyama | 173/168 |
| 5,637,125 A | | 6/1997 | Amada | |
| 6,387,140 B1 | * | 5/2002 | Choi | 55/323 |
| 6,517,593 B1 | | 2/2003 | Robertson et al. | |
| 6,726,080 B2 | | 4/2004 | Hamada | |
| 7,122,066 B2 | | 10/2006 | Avery | |
| 7,481,862 B2 | * | 1/2009 | Attassery | 55/502 |
| 2006/0081528 A1 | * | 4/2006 | Oelpke et al. | 210/493.1 |
| 2006/0162302 A1 | | 7/2006 | Terrell | |

FOREIGN PATENT DOCUMENTS

TW M269157 7/2005

* cited by examiner

*Primary Examiner*—Duane Smith
*Assistant Examiner*—Minh-Chau T Pham
(74) *Attorney, Agent, or Firm*—Chun-Ming Shih

(57) ABSTRACT

An exemplary compressed air filter assembly for nail gun has an end cap at a handle of the nail gun, having an inlet aperture for guiding external compressed air therein, communicating with a main air chamber of the handle; an inlet pipe extending in the inlet aperture and the main air chamber, having a ring-shaped step formed at an inner peripheral surface of a sidewall thereof; and a filter disposed at the inlet pipe. At least one bar is provided at the sidewall of the inlet pipe, transversely disposed in the inlet aperture, and the filter being disposed between the at least one bar and the ring-shaped step. The compressed air filter assembly for nail gun utilize the at least one bar to support a center portion of the filter, which can improve the strength of the filter to resist the blasting of the compressed air.

4 Claims, 5 Drawing Sheets

COMPRESSED AIR FILTER ASSEMBLY FOR NAIL GUN

BACKGROUND

The present invention relates to a compressed air filter assembly for a nail gun, and more particularly to an air filter unit installed at an end cap of a handle of a nail gun, capable of filtering dust or the like in the compressed air guided into a main air chamber of the nail gun.

As generally known, a handle of a typical nail gun has a main air chamber, the compressed air being guided therein through an inlet port of an end cap disposed at a tail end of the handle. The compressed air is accommodated in a gun body of the nail gun, as a power source of driving a piston. In addition, the inlet port extends into the main air chamber to form an inlet pipe, and a filter is provided between the main air chamber and the inlet port for preventing dust or the like from entering inside. The filter is generally made from soft cotton or unwoven cloth.

As shown in U.S. Pat. No. 5,259,465, U.S. Pat. No. 6,517,593, U.S. Pat. No. 6,726,080 and U.S. Pat. No. 7,122,066, a filter is provided between the inlet port of the end cap and the main air chamber of the handle, for filtering the impurities in the compressed air.

However, the fixing way of the filter between the end cap and the handle makes the filter to easily fall off in the process of assembling or disassembling the end cap. Thus, the filter is easy to be affected with damp or be defiled. In addition, the filter is easy to be deformed under a rotating force provided on the end cap, which reduces the filtration capacity of the filter. Moreover, after a period of usage, the center portion of the filter being blasted by the compressed air is easy to produce distortion, which lowers the usage life of the filter.

To resolve above described questions, TW Pat. No. M269157 discloses a technology of locating a filter at the inlet pipe. As shown in FIG. 9, an inlet pipe 21a of an end cap 2a disposed at a tail end of a handle 1a has a ring-shaped step 22a and a ring-shaped groove 25a formed on an inner peripheral surface. A filter 3a is set in the inlet pipe 21a. The ring-shaped groove 25a has a ring-shaped fastener 8, and the filter 3a is fixed between the fastener 8 and the step 22a. That is, the filter 3a is located between a main air chamber 10a of the handle 1a and an inlet port 20a. However, the technology still has the question of a center portion 31a of the filter 3a being distorted under long time blasting of the compressed air, which lowers the usage life of the filter 3a.

Furthermore, U.S. Pat. No. 5,637,125 and U.S. Pat. No. 20060162302 also disclose a technology of screwing a cylindraceous filter device having a filter therein at an inlet pipe, which is used to filter the compressed air being guided into the main air chamber through the inlet pipe. However, the cylindraceous filter device makes the structure more complex comparing to the above described structure having a single filter. Thus, the cost is increased.

Accordingly, what is needed is a compressed air filter assembly for nail gun that can overcome the above-described deficiencies.

BRIEF SUMMARY

In order to resolve the above described low service durability of a filter, the present invention provides a compressed air filter assembly for a nail gun, which can prevent the distortion of the filter, especially under a long time blasting of the compressed air, and improve the stability and the usage life of the filter. In addition, the compressed air filter assembly for a nail gun can further improve the manufacturing and assembling efficiency.

For attaining the above described purpose, an exemplary compressed air filter assembly for nail gun has an end cap at a handle of the nail gun, having an inlet aperture for guiding external compressed air therein, communicating with a main air chamber of the handle; an inlet pipe extending in the inlet aperture and the main air chamber, having a ring-shaped step formed at an inner peripheral surface of a sidewall thereof, and a filter disposed at the inlet pipe. At least one bar is provided at the sidewall of the inlet pipe, transversely disposed in the inlet aperture, and the filter being disposed between the at least one bar and the ring-shaped step.

Thus, the compressed air from the inlet aperture is filtered by the filter for isolating the dust or like therein, and is guided into the main air chamber, as a power source of driving a piston. In the operating process, a center portion of the filter can resist the blasting force of the compressed air by the support of the at least one bar. Thus, no distortion of the center portion or falling off of the filter is produced because directly resists the blasting of the compressed air.

In addition, the compressed air filter assembly further provides a clapboard having a plurality of guiding holes, disposed between the at least one bar and the filter. The ring-shaped step has a ring-shaped embedded groove, receiving an airtight ring therein.

Another exemplary compressed air filter assembly for nail gun has an end cap at a handle of the nail gun, having an inlet aperture for guiding external compressed air therein, communicating a main air chamber of the handle; an inlet pipe extending in the inlet aperture and the main air chamber, having a ring-shaped step formed at an inner peripheral surface of a sidewall thereof, and a filter disposed at the inlet pipe. A sleeve is provided at the inlet pipe, which has a plurality of guiding holes at one end of the inlet pipe; and at least one bar is provided at the sidewall of the inlet pipe and the sidewall of the sleeve, transversely disposed in the inlet aperture, and the filter being disposed between the plurality of guiding holes and the inlet aperture.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
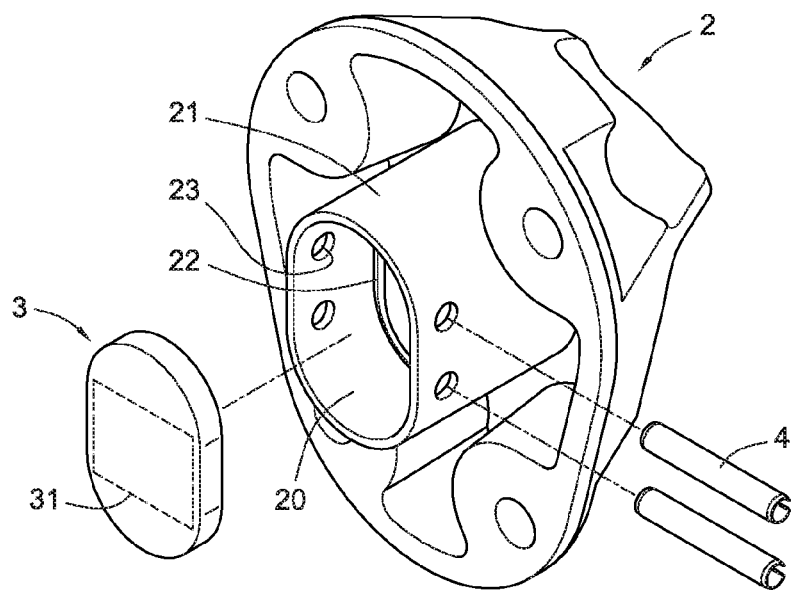
FIG. 1 is a front, top and right-side exploded isometric view of a compressed air filter assembly for a nail gun according to a first embodiment of the present invention.
Figure 2:
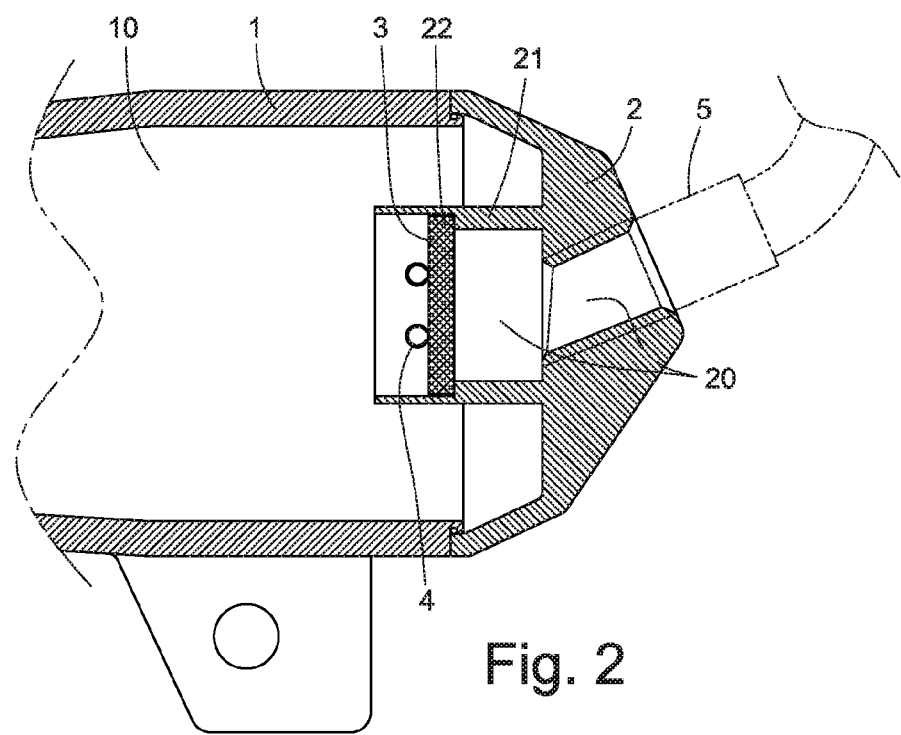
FIG. 2 is a cross-sectional view of the compressed air filter assembly of FIG. 1.

Referring to FIG. 1 and FIG. 2, a compressed air filter assembly for a nail gun according to a first embodiment of the present invention is shown. The filter assembly has an inlet aperture 20 formed at an end cap 2 of a nail gun handle 1, for guiding external compressed air therein. The inlet aperture 20 communicates with a main air chamber 10 of the nail gun handle 1. An inlet pipe 21 extends in the inlet aperture 20 and the main air chamber 10, which has a ring-shaped step 22 formed at its inner peripheral surface of its sidewall. A filter 3 is disposed in the inlet pipe 21, which is made from filter cotton or unwoven cloth.

According to the above-described structure, at least one bar 4 is provided at the sidewall of the inlet pipe 21, which transversely disposed in the inlet aperture 20 of the inlet pipe 21. In the first embodiment, two bars 4 are provided. The filter 3 is sandwiched between the at least one bar 4 and the ring-shaped step 22.

In a concrete embodiment, at least one pair through holes 23 is formed at the sidewall of the inlet pipe 21. In this embodiment, two pairs of through holes 23 are provided. The two bars 4 drill through the two pairs of through holes 23 respectively.

Figure 3:
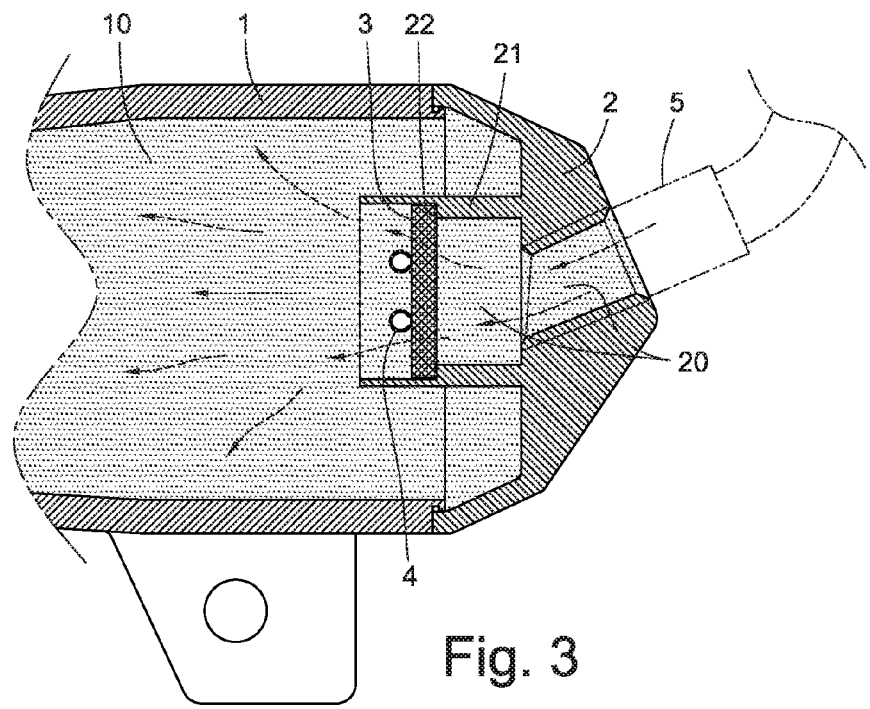
FIG. 3 shows an usage state of the compressed air filter assembly of FIG. 1.
Figure 4:
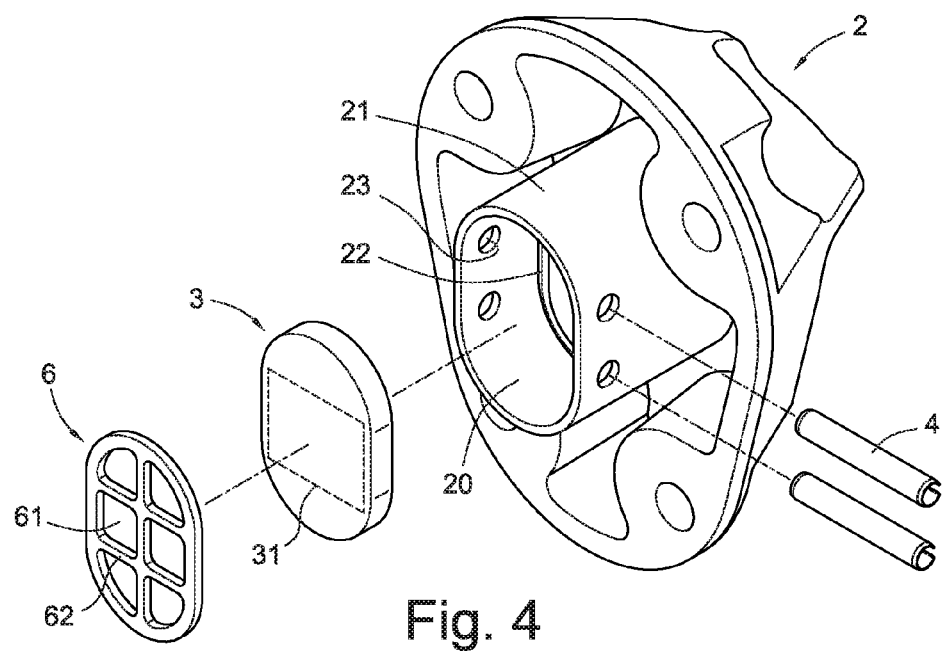
FIG. 4 is a front, top and right-side exploded isometric view of a compressed air filter assembly for nail gun according to a second embodiment of the present invention.

Via assembling the above-described elements, when the compressed air filling pipe 5 guides the compressed air into the inlet pipe 21 through the inlet aperture 20, the compressed air is filtered by the filter 3 for isolating the dust or like therein, and is guided into the main air chamber 10, as a power source of driving a piston. In the process, a center portion 31 of the filter 3 can resist the blasting force of the compressed air by the support of the bars 4 (as shown in FIG. 3). Thus, no distortion of the center portion 31 or falling off of the filter 3 is produced because directly resists the blasting of the compressed air. Therefore, the stability and the usage life of the filter 3 can be improved Referring to FIG. 4, an exploded isometric view of a compressed air filter assembly for a nail gun according to a second embodiment of the present invention is shown. The compressed air filter assembly has a similar structure of the filter assembly of the first embodiment except a clapboard 6 is further provided, being disposed between the bars 4 and the filter 3. The clapboard 6 has a plurality of ribs 62 crossing to form a plurality of guiding holes 61. In addition, a ring-shaped embedded groove 26 is formed at the ring-shaped step 22, which receives an airtight ring 9 for preventing the compressed air flowing in the main air chamber 10 through the gap between the filter 3 and the ring-shaped step 22 or the filter 3 and the inner peripheral surface of the inlet pipe 21. The airtight ring 9 increases the airproof characteristics between the filter 3 and the ring-shaped step 22 or the filter 3 and the inner peripheral surface of the inlet pipe 21, which can prevent the dust or like being guided into the main air chamber 10 through the gaps therebetween. In addition, the ring-shaped embedded groove 26 and the airtight ring 9 can also be provided at the ring-shaped step 22 of the filter assembly of the first embodiment for preventing the dust in the compressed air into the main air chamber 10.

Figure 5:
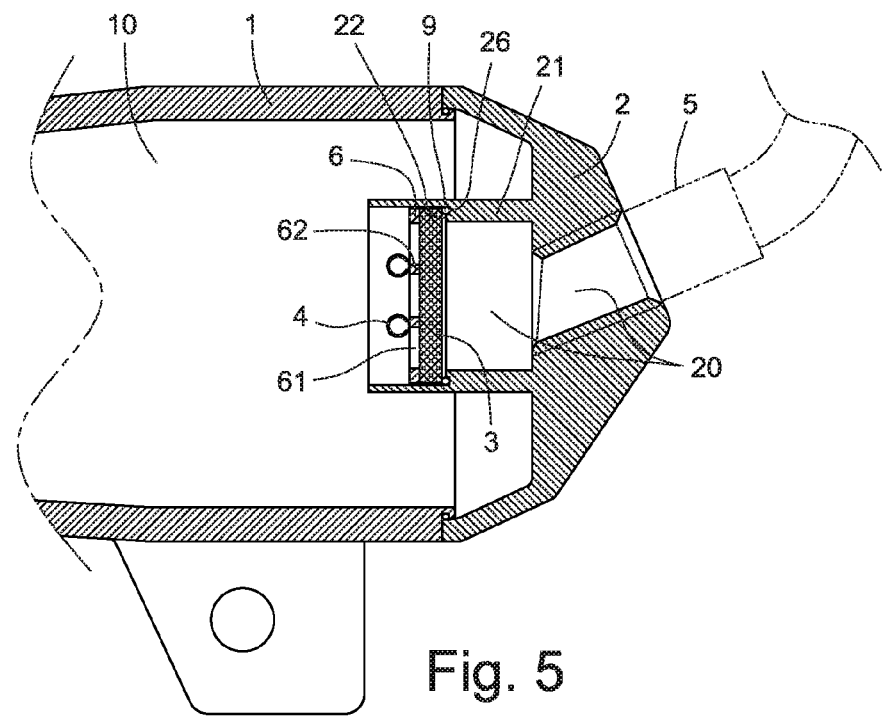
FIG. 5 is a cross-sectional view of the compressed air filter assembly of FIG. 4.

In this embodiment, the compressed air is guided into the main air chamber 10 through the inlet pipe 20, the filter 3 and the plurality of guiding holes 61, for accommodating the compressed air pressure (as shown in FIG. 5). In addition, the clapboard 6 can be located at the inlet aperture 20 through the bars 4. The center portion 31 of the filter 3 can resist the blasting force of the compressed air by the plurality of ribs 62 of the clapboard 6.

Figure 6:
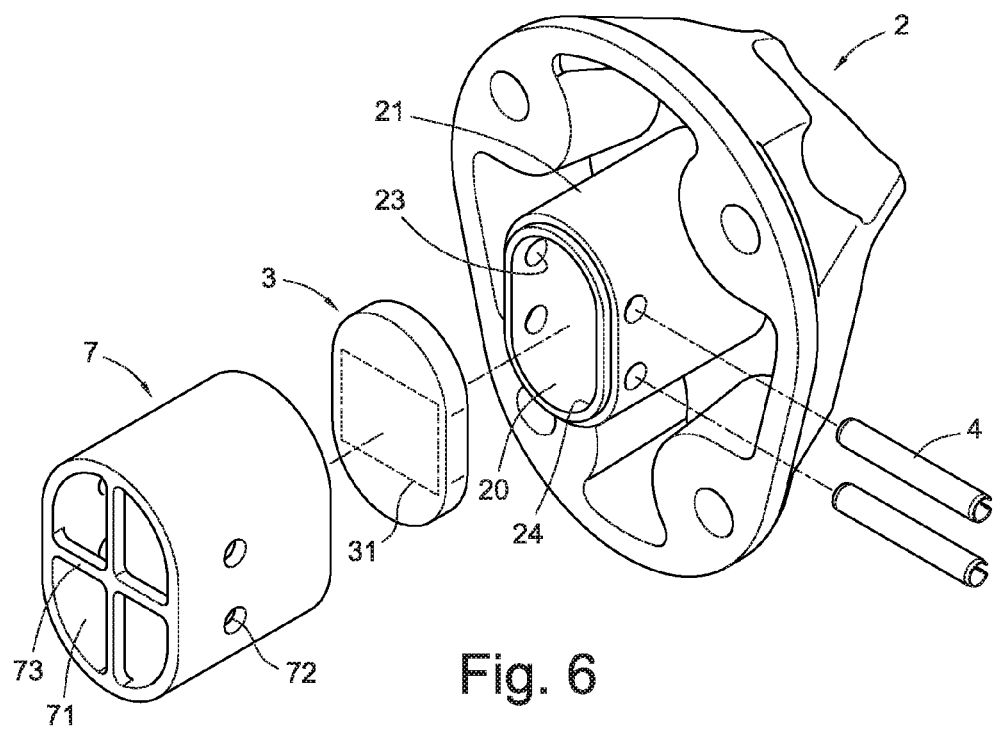
FIG. 6 is a front, top and right-side exploded isometric view of a compressed air filter assembly for nail gun according to a third embodiment of the present invention.
Figure 7:
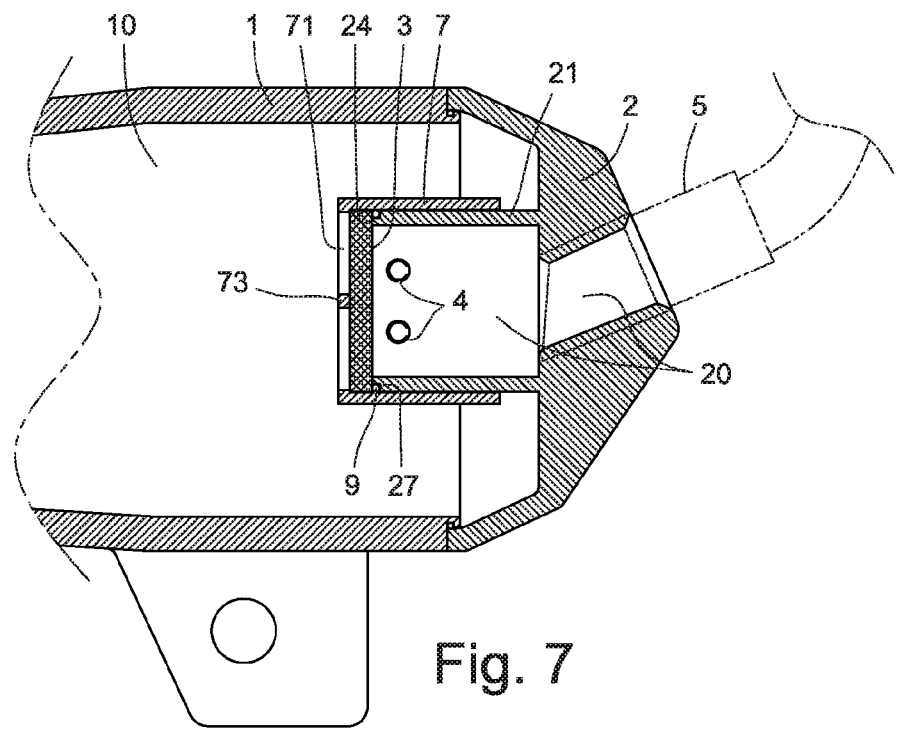
FIG. 7 is a cross-sectional view of the compressed air filter assembly of FIG. 6.

Referring to FIG. 6 and FIG. 7, an exploded isometric view of a compressed air filter assembly for a nail gun according to a third embodiment of the present invention is shown. The compressed air filter assembly has a similar structure of the filter assembly of the first embodiment except that the inlet pipe 21 does not have the ring-shaped step 22 (as shown in FIG. 2). The filter 3 covers a nozzle 24 of the inlet pipe 21, and a sleeve 7 is provided on the inlet pipe 21. The sleeve 7 has a plurality of guiding holes 71. At least one bar 4 drills through the sidewalls of the inlet pipe 21 and the sleeve 7, transversely disposed in the inlet aperture 20. In this embodiment, two bars 4 are provided. The filter 3 is sandwiched between the plurality of guiding holes 71 of the sleeve 7 and the inlet aperture 20 of the inlet pipe 21.

The inlet pipe 21 has at least one pair of through holes 23 (as shown in FIG. 6), opposite to each other. The sleeve 7 also has at least one pair of via holes 72, corresponding to the through holes 23 of the inlet pipe 21. In this embodiment, two pairs of through holes 23 and two pair of via holes 72 are provided. Each bar 4 drills through the via holes 72 and the corresponding through holes 23 for locating the sleeve 7 on the inlet pipe 21. The sleeve 7 further has a plurality of crossed ribs 73, which define the plurality of the guiding holes 71. In addition, the nozzle 24 of the inlet pipe 21 has a ring-shaped embedded groove 27 receiving the airtight ring 9 for stopping the compressed air into the main air chamber 10 through gaps between the filter 3 and the nozzle 24 or gaps between the filter 3 and the sleeve 7. Thus, the airtight ring 9 increases the airproof characteristics between the filter 3 and the nozzle 24 or gaps between the filter 3 and the sleeve 7, which can prevent the dust or like being guided into the main air chamber 10 through the gaps therebetween.

Figure 8:
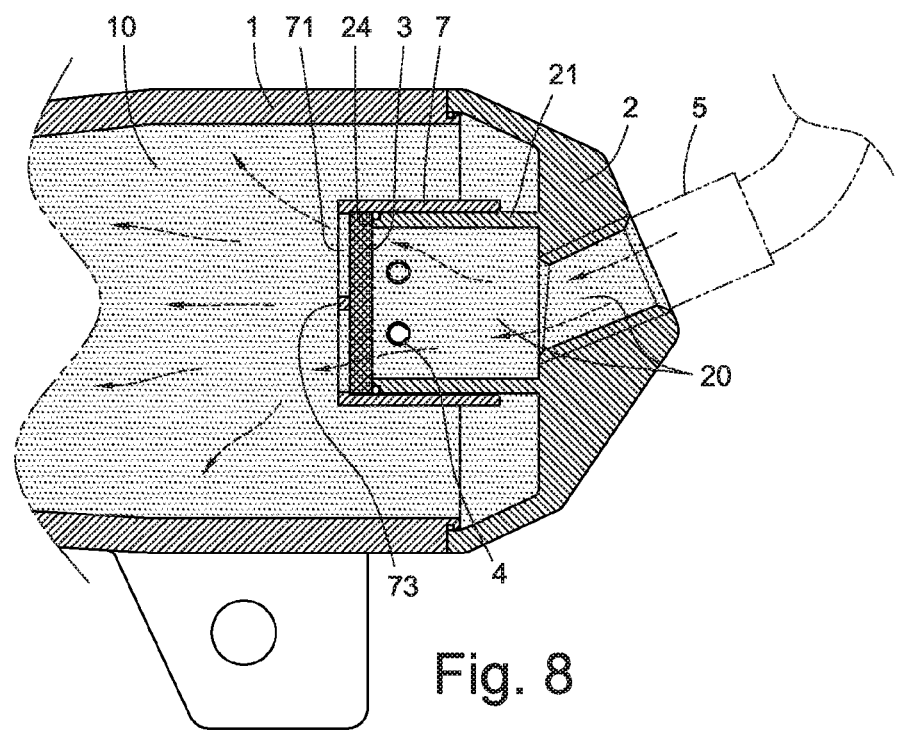
FIG. 8 shows an usage state of the compressed air filter assembly of FIG. 7.
Figure 9:
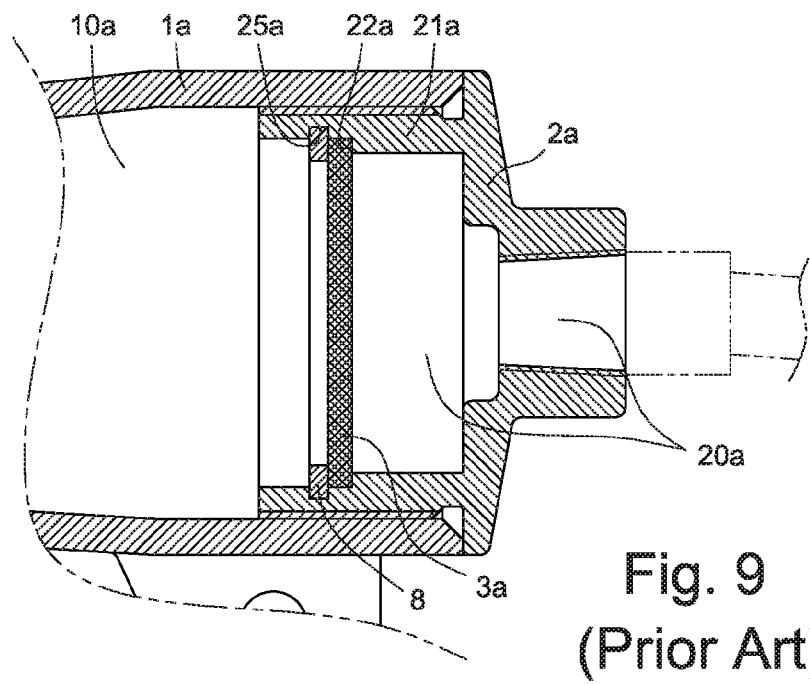
FIG. 9 is a cross-sectional view of a conventional end cap having a filter for a nail gun.
Figure 10:
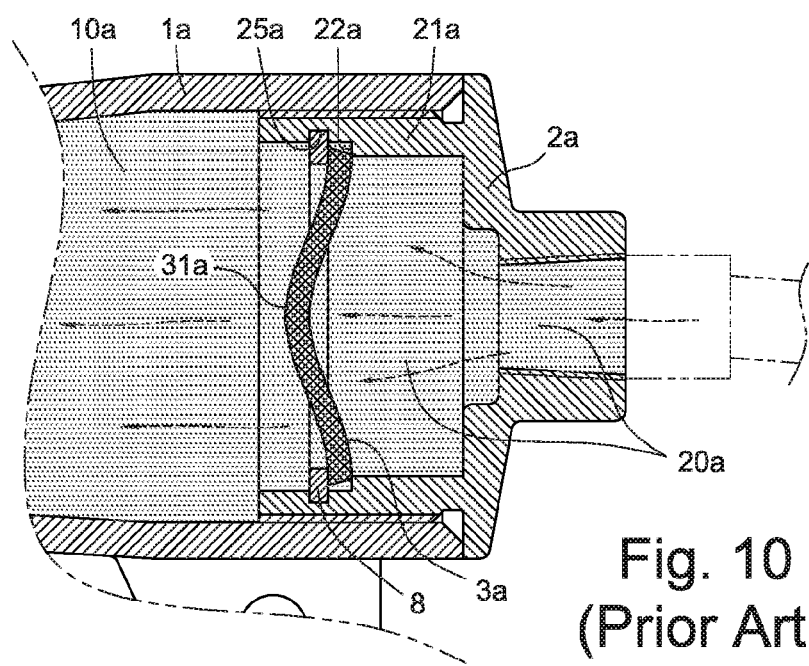
FIG. 10 shows an usage state of the end cap of FIG. 9.

Thus, the compressed air is guided into the main air chamber 10 through the inlet pipe 20, the filter 3 and the plurality of guiding holes 71 for accommodating the compressed air pressure (as shown in FIG. 8). The center portion 31 of the filter 3 can resist the blasting force of the compressed air by the plurality of ribs 73 of the sleeve 7.

Therefore, the compressed air filter assembly for nail gun utilize the at least one bar 4 or the plurality of ribs 62 (73) to support the center portion 31 of the filter 3, which can improve the strength of the filter 3 to resist the blasting of the compressed air.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A compressed air filter assembly for nail gun, comprising:

an end cap at a handle of the nail gun, having an inlet aperture for guiding external compressed air therein, communicating a main air chamber of the handle;

an inlet pipe extending in the inlet aperture and located in the main air chamber, comprising a nozzle formed at distal end thereof;

a filter disposed at the nozzle; and a sleeve sleeved on the inlet pipe, which comprises a plurality of guiding holes at one end thereof;

wherein at least one bar is provided at the sidewall of the inlet pipe and the sidewall of the sleeve, transversely disposed in the inlet aperture for securely fixing the sleeve on the inlet pipe, and the filter being disposed between the plurality of guiding holes and the nozzle.

2. The compressed air filter assembly as claimed in the claim 1, wherein the inlet pipe comprises at least one pair of through holes, and the sleeve comprises at least one pair of via holes, corresponding to the at least one pair of through holes, at least one pair of bars drilling through the at least one pair of through holes and the at least one pair of via holes, respectively, so that the sleeve is securely fixed on the inlet pipe.

3. The compressed air filter assembly as claimed in the claim 1, wherein the sleeve comprises a plurality of crossed ribs at the end thereof to define the plurality of guiding holes.

4. The compressed air filter assembly as claimed in the claim 1, wherein the nozzle of the inlet pipe comprises a ring-shaped embedded groove for receiving an airtight ring when the filter is disposed on the nozzle.

* * * * *